US012469412B1

(12) United States Patent
Mozo Olea et al.

(10) Patent No.: US 12,469,412 B1
(45) Date of Patent: Nov. 11, 2025

(54) COMPOSITE SHIPPING LABELS FOR MULTI-LOCATION DELIVERIES

(71) Applicant: Amazon Technologies, Inc., Seattle, WA (US)

(72) Inventors: Javier Mozo Olea, Seattle, WA (US); Vincent Arthus, Olm (LU)

(73) Assignee: Amazon Technologies, Inc., Seattle, WA (US)

(*) Notice: Subject to any disclaimer, the term of this patent is extended or adjusted under 35 U.S.C. 154(b) by 495 days.

(21) Appl. No.: 17/957,993

(22) Filed: Sep. 30, 2022

(51) Int. Cl.
*G09F 3/10* (2006.01)
*G09F 3/00* (2006.01)
*G09F 3/02* (2006.01)
*G06Q 10/083* (2023.01)

(52) U.S. Cl.
CPC .............. *G09F 3/10* (2013.01); *G09F 3/0288* (2013.01); *G09F 3/0297* (2013.01); *G06Q 10/083* (2013.01); *G09F 2003/022* (2013.01); *G09F 2003/0245* (2013.01)

(58) Field of Classification Search
CPC ........ G09F 3/10; G09F 3/0288; G09F 3/0297; G09F 2003/022; G09F 2003/0245; G06Q 10/083
See application file for complete search history.

(56) References Cited

U.S. PATENT DOCUMENTS

| | | | | |
|---|---|---|---|---|
| 4,631,845 A * | 12/1986 | Samuel | ................. | G09F 3/0288 40/6 |
| 5,421,778 A | 6/1995 | Kouramanis | | |
| 2003/0141976 A1 | 7/2003 | Dickinson et al. | | |
| 2006/0026871 A1 * | 2/2006 | Alexander | ............ | G09F 3/0288 40/6 |
| 2019/0279181 A1 * | 9/2019 | Kelly | ....................... | G07F 9/023 |
| 2020/0143322 A1 * | 5/2020 | Dearing | ............. | G06K 7/10861 |
| 2020/0250614 A1 * | 8/2020 | Zhu | .................... | G06Q 10/0836 |

* cited by examiner

*Primary Examiner* — Gary C Hoge
(74) *Attorney, Agent, or Firm* — Kilpatrick Townsend & Stockton LLP

(57) ABSTRACT

Composite shipping labels for multi-location deliveries are described herein. In an example, a computer system receives a request for a delivery of an item to a delivery location associated with an intermediate location. The item is to be delivered to the intermediate location prior to being delivered to the delivery location. The computer system causes a printing of a label for the item. The label includes a first label part indicating the delivery location. The first label part is configured to be coupled to the item. The label also includes a second label part indicating the intermediate location. The second label part is configured to be positioned at least partially covering the first label part and at least partially detachable from the first label part. The computer system instructs an operation of attaching the label to the item.

8 Claims, 11 Drawing Sheets

COMPOSITE SHIPPING LABELS FOR MULTI-LOCATION DELIVERIES

BACKGROUND

A user may request that an item be delivered to a delivery location. To facilitate transportation of the item to the delivery location, a label can be generated and affixed to the item indicating the delivery location. The label may additionally be used to track the transportation of the item to the delivery location.

BRIEF DESCRIPTION OF THE DRAWINGS

Various embodiments in accordance with the present disclosure will be described with reference to the drawings, in which.

DETAILED DESCRIPTION

Figure 1:
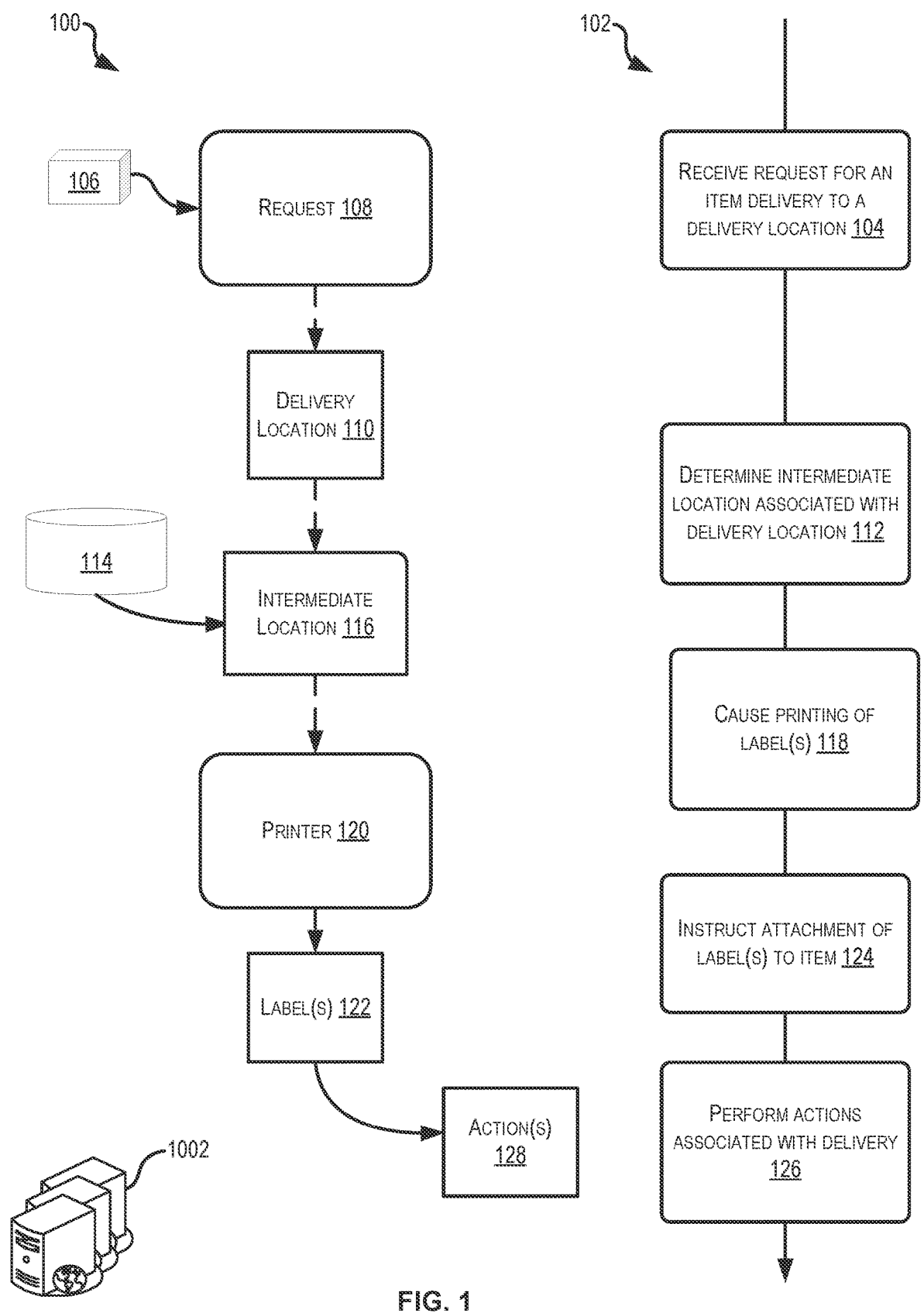
FIG. 1 illustrates an example block diagram and associated flowchart showing a process for implementing techniques relating to composite shipping labels for multi-location deliveries, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments described herein are directed to, among other things, various techniques for generating and managing labels for multi-location deliveries, and composite labels that include multiple parts and can be used for multi-location deliveries. A user may request an item to be delivered to a delivery location (e.g., employee mailbox, student mailbox, employee office number, campus building, etc.), but the delivery location may be associated with an intermediate location (e.g., mailroom or other common location) to which the item is delivered before being delivered to the delivery location. A first entity may be responsible for delivering to the intermediate location (e.g., a shipping company) and a second carrier (e.g., an employee from the mailroom) may be responsible for delivery to the final delivery location. A label indicating the final delivery location may be placed on an exterior surface of the item. But, the delivery agent may be notified via a user device that the item is to be delivered to the intermediate location. The difference in the identified locations can cause confusion for the delivery agent, and may ultimately result in items being incorrectly delivered, which can add processing time to determine where an item is and how to perform corrective actions.

Embodiments of the present disclosure provide a computer system that can generate a composite shipping label for a multi-location delivery. The computer system receive a request for a delivery of an item to an address associated with an intermediate delivery location. Rather than only including the final delivery address on a shipping label for the item, the computer system can cause a printing of a composite shipping label for the item, and the composite shipping label can include an indication of both the intermediate delivery location and the final delivery address. A first label part can indicate the final delivery address and a second label part can indicate the intermediate location (e.g., an address of the intermediate location). The computer system can instruct an operation of attaching the label to the item so that the first label part and the second label part are both attached to the item, but only the intermediate location is visible and not the final delivery address. When a delivery agent delivers the item to the intermediate location, the second label part can be at least partially detached to reveal the final delivery address so that the delivery to the delivery location can be performed.

In a particular example, a computing device can receive, via an online marketplace, a request for an item to be delivered to a mailbox of a student that lives on a college campus. The college campus can include a common location where all items being delivered to a building or mailbox of the campus are to be delivered before being distributed to the rest of the campus. Upon receiving the request, the computing device can determine the common location that is associated with the mailbox. The computing device can then instruct printing of a label for the delivery of the item to the common location and then to the mailbox. For example, the computing device can cause a first label part to be printed with an address of the mailbox on a front side and an adhesive on a bottom side. The computing device can also cause a second label part to be printed with an address of the common location on a front side and an adhesive, or other attachment mechanism, on a bottom side. The computing device can then instruct that the first label part is to be affixed to an exterior surface of the item using the adhesive and that the second label part is to then be affixed over top of the first label part to cover at least a portion of the first label part that includes the address of the delivery location. A delivery agent can then transport the item to the common location, at which point the delivery agent can use a device to scan a barcode on the second label part. The computing device can determine that, based on the scan, the item is at the common location and cause a notification to be presented at the device notifying the delivery agent that the second label part is to be at least partially removed to reveal the address of the delivery location.

Techniques described herein provide several technical advantages over a conventional multi-location delivery process. For example, rather than printing a label with a first location and indicating a different location to a delivery agent, the present disclosure provides a technique for generating a composite shipping label when a delivery involves a stop at an intermediate location. As such, deliveries may be performed more accurately and in less time since corrective action of redirecting to an intermediate location can be minimized using the multi-part labels. In addition, the reduction in time can also result in fewer computing resources being used for a delivery. The delivery agent may be notified of a second label for the delivery location once the item is at the intermediate location, which can further ensure that the item is correctly delivered from the intermediate location to the delivery location.

Turning now to the figures, FIG. 1 illustrates an example block diagram 100 and associated flowchart showing a process 102 for implementing techniques relating to composite shipping labels for multi-location deliveries, according to at least one example.

The diagram 100 depicts devices, objects, and the like that correspond to the process 102. The process 102 can be performed by any suitable combination of hardware and/or software, as described herein.

FIGS. 1, 2, 3, 4, and 9 illustrate example flow diagrams showing respective processes 102, 200, 300, 400, and 900, as described herein. The processes 102, 200, 300, 400, and 900, are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

A label management engine 1010 (FIG. 10) embodied in a computer system 1002 (FIG. 10) and/or within a user device 1004 (FIG. 10) may perform the process 102. Thus, while the description below is from the perspective of the computer system 1002, the user device 1004 may also perform the process 102 or portions of the process 102.

The process 102 may begin at block 104 by the computer system 1002 receiving a delivery request 108 for an item delivery to a delivery location 110. The request 108 can be to deliver item 106 to the delivery location 110, which may be a residential address, a commercial building address, a particular room within a building, etc. The computer system 1002 can be associated with an online marketplace through which the request 108 can be received from a user. The request 108 may also be received via other mechanisms. For example, the computer system 1002 may be associated with a fulfillment or shipping service that delivers items on behalf of sellers.

The process 102 may continue at block 112 by the computer system 1002 determining an intermediate location 116 associated with the delivery location 110. In some instances, the delivery location 110 may be part of or managed by an entity, and deliveries for locations associated with the entity can be delivered to an intermediate location before being delivered to the final delivery locations. For example, if the delivery location 110 is a student mailbox on a college campus, the intermediate location 116 may be a campus mailroom. The computer system 1002 can access a database 114 that stores associations between delivery locations and intermediate locations to determine that the intermediate location 116 is associated with the delivery location 110. The computer system 1002 may alternatively receive an indication of a geographic boundary including a geographic area in which addresses are associated with the intermediate location 116. For example, the geographic boundary may be an outer boundary of a college campus, and each building and mailbox within the geographic boundary can be associated with an intermediate location of the campus mailroom. So, upon receiving the request 108 indicating the delivery location 110, the computer system 1002 can determine that the delivery location 110 is within the geographic boundary and thus is associated with the intermediate location 116.

The process 102 may continue at block 118 by the computer system 1002 causing a printing of label(s) 122. The computer system 1002 can instruct a printer 120 to print the label(s) 122. Since the item 106 is to be delivered to the intermediate location 116 prior to being delivered to the delivery location 110, the label(s) 122 can include an indication of both locations. In some instances, a first delivery agent may transport the item 106 from a storage facility to the intermediate location 116, and a second delivery agent may transport the item 106 from the intermediate location 116 to the delivery location 110. The first delivery agent may be associated with the online marketplace and the second delivery agent may be associated with the entity. Alternatively, the first delivery agent may also transport the item 106 from the intermediate location 116 to the delivery location 110.

To reduce a likelihood that the item 106 is delivered incorrectly, the label(s) 122 may be generated so that only information associated with the intermediate location 116 is initially visible. To do this, the label(s) 122 may include separate label parts for the intermediate location 116 and the delivery location 110. A first label part of the label(s) 122 part can include an address of the delivery location 110 on a front surface of the first label part. The first label part may additionally include an identifier (e.g., name) of the user associated with the delivery location 110. A bottom surface of the first label part can include an attachment mechanism (e.g., an adhesive) for coupling the first label part to an exterior surface of the item 106. A second label part of the label(s) 122 part can include an address of the intermediate location 116 on a front surface of the second label part. The second label part may additionally include information associated with the intermediate location 116. For example, the information can include an identifier of a manager or operator of the intermediate location 116, hours of operation of the intermediate location 116, contact information for the intermediate location 116, etc. A bottom surface of the second label part can also include an attachment mechanism for coupling the second label part to either the first label part or the exterior surface of the item 106. Each of the first label part and the second label part may additionally include the same or different barcodes (or other optical or non-optical identifiers) for tracking delivery of the item 106 to the intermediate location 116 and the delivery location 110.

The label(s) 122 are described in more detail herein below, but the label parts may be part of a single label, or may be separate labels. So, the printer 120 may be instructed to print one or multiple labels. Or, different printers may be instructed to each print a label of the label(s) 122. The label(s) 122 may be a composite delivery label having multiple parts that are made from paper, plastic, or another suitable material. Each part of the composite shipping label can include delivery information for either the delivery location 110 or the intermediate location 116.

The process 102 may continue at block 124 by the computer system 1002 instructing an attachment of the label(s) 122 to the item 106. For example, if the label(s) 122 include separate label parts for the intermediate location 116 and the delivery location 110, the instructions may indicate that the front surface of the second label part for the intermediate location 116 is to be positioned to cover the identifier of the delivery location 110 on the first label part. So, the instructions may include a first operation of attaching the first label part to the exterior surface of the item 106 and a second operation of positioning the second label part over at least a portion of the first label part. Or, if the label parts are part of a single label, the instructions can include an operation of attaching the label 122 so that the identifier of the intermediate location 116 of the second label part is visible, while the identifier of the delivery location 110 of the first label part is not visible.

The process 102 may continue at block 126 by the computer system 1002 performing actions 128 associated with the delivery. For example, the actions 128 may involve receiving a scanning of the barcode of the second label part at the intermediate location 116, indicating that the item 106 has been delivered to the intermediate location 116. The scanning can be received from a device of a delivery agent performing the delivery. The computer system 1002 can then cause the action 128 of sending a notification to the device of the delivery agent indicating that the second label part is to be at least partially detached from the first label part. Detaching the second label part may involve peeling the second label part off of the item, unfolding the second label part to reveal the first label part, or another action as described in further detail below. The computer system 1002 may additionally send a notification to a user device of the user that requested to the delivery indicating that the item 106 is at the intermediate location 116. The same or a different delivery agent can then deliver the item 106 from the intermediate location 116 to the delivery location 110 based on the first label part that has been revealed. Upon arrival at the delivery location 110, the barcode on the first label part may be scanned by the delivery agent, and the computer system 1002 can perform another action 128 of sending another notification to the user device of the user, indicating that the item 106 is at the delivery location 110.

Figure 2:
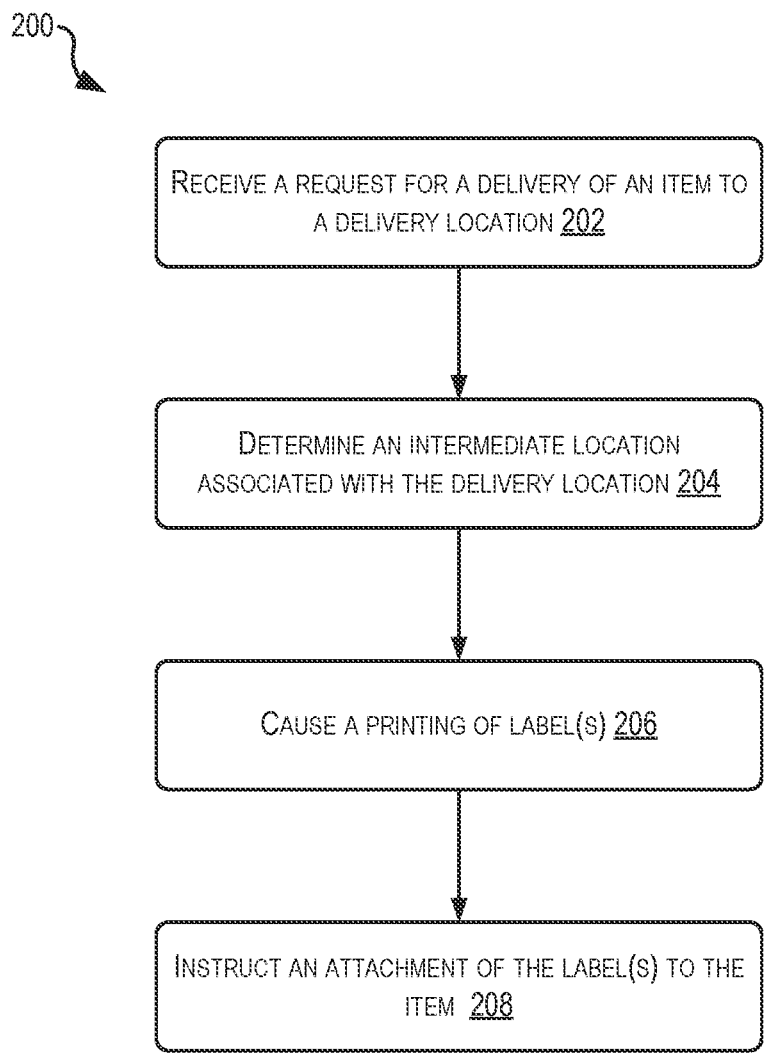
FIG. 2 illustrates an example flowchart showing a process of generating composite shipping labels a multi-location delivery, according to at least one example.

FIG. 2 illustrates an example flowchart showing a process 200 of generating labels (e.g., label(s) 122 in FIG. 1) for a multi-location delivery, according to at least one example. The label management engine 1010 (FIG. 10) embodied in the computer system 1002 (FIG. 10) and/or within the user device 1004 (FIG. 10) may perform the process 200. Thus, while the description below is from the perspective of the computer system 1002, the user device 1004 may also perform the process 200 or portions of the process 200.

The process 200 may begin at block 202 by the computer system 1002 receiving a request (e.g., request 108 in FIG. 1) for a delivery of an item (e.g., item 106 in FIG. 1) to a delivery location (e.g., delivery location 110 in FIG. 1). The request 108 can include an identifier (e.g., address) of the delivery location. A user may access an online marketplace to generate the request for the delivery of the item.

The process 200 may continue at block 204 by the computer system 1002 determining an intermediate location (e.g., intermediate location 116 in FIG. 1) associated with the delivery location. The intermediate location can be a location in which the item is to be delivered prior to being delivered to the delivery location. For example, the delivery location may be an office within a commercial building, but the intermediate location can be a mailroom that processes deliveries for all offices of the commercial building. So, rather than the item being delivered directly from a shipment facility to the office, the item is to be delivered from the shipment facility to the mailroom, and then from the mailroom to the office. The computer system 1002 can access a database that indicates which delivery locations are associated with intermediate locations to determine that the delivery location is associated with the intermediate location. Intermediate locations can change dynamically and be updated in the database accordingly. For example, an intermediate location may be added for a series of delivery locations based on temporary inaccessibility to the delivery location (e.g., during construction, a natural disaster, etc.). Associations between delivery locations and intermediate locations can be updated when an intermediate location is created for one or more delivery locations, when an intermediate location is eliminated from use, when two different intermediate locations each serving one or more delivery locations are combined into a single intermediate location, and when a single intermediate location serving two or more delivery locations is divided into two or more intermediate locations that each serve their own delivery locations.

The process 200 may continue at block 206 by the computer system 1002 causing a printing of label(s) (e.g., label(s) 122 in FIG. 1). During packing of the item, a barcode may be attached to the item that can be scanned by the computer system 1002 to determine a configuration and information for the label. So, once the computer system 1002 scans the barcode, the computer system 1002 can determine the configuration and information for the label(s) and cause a printer to generate the label(s) accordingly. The label(s) can include multiple label parts that may be separate or partially integrally formed. For instance, a first label part can be associated with the delivery location and the second label part can be associated with the intermediate location. The computer system 1002 can instruct the printer to generate the label parts. So, the computer system 1002 may instruct the printer to print the first label part separately from the second label part, or, the computer system 1002 may instruct the printer to print the first label part as part of the same label as the second label part, but in such a way that the second label part is at least partially detachable from the first label part to reveal the first label part. If the label parts are separate, the first label part and the second label part may be the same size, or may have different dimensions. If the label parts have different dimensions, the computer system 1002 may instruct different printers, each capable of printing the dimensions of one of the label parts, to print the label parts.

The process 200 may continue at block 208 by the computer system 1002 instructing an attachment of the label(s) to the item. The computer system 1002 can determine the instructions for attaching the label(s) from the scanning of the barcode prior to generating the label(s). At least a bottom surface of the first label part indicating the final delivery location can include an attachment mechanism for coupling the first label part to an exterior surface of the item. The attachment mechanism may be an acrylic adhesive for adhering the bottom surface of the first label part to the item. If the second label part is integrally formed with the first label part (e.g., coupled along at least one edge by, for example, perforations), the second label part may not be separately affixed to the item. But, if the second label part is separate from the first label part, a bottom surface of the second label part may additionally include an attachment mechanism. The attachment mechanism (e.g., acrylic adhesive, hook-and-loop fastener, tape, glue, a shared edge of the second label part and the first label part, etc.) may couple to a front surface of the first label part, to the exterior surface of the item, or a combination thereof so that the second label part at least partially covers the first label part. Rather than the attachment mechanism being on the bottom surface, an attachment mechanism (e.g., tape) may alternatively be applied on top of the front surface of the second label part to affix the second label part to the first label part or the item.

In any case, the computer system 1002 can instruct how the label is to be attached to the item. For example, the computer system 1002 may output instructions to a device of a delivery agent indicating an order of operations for attaching the label parts to the item. For instance, the instructions can indicate how the first label part is to be attached to the item and how the second label part is to be attached to the first label part and/or the item. Or, the computer system 1002 may cause the operation of another device (e.g., robotic arm, air jet, etc.) to perform the attachment of the label parts to the item.

Figure 3:
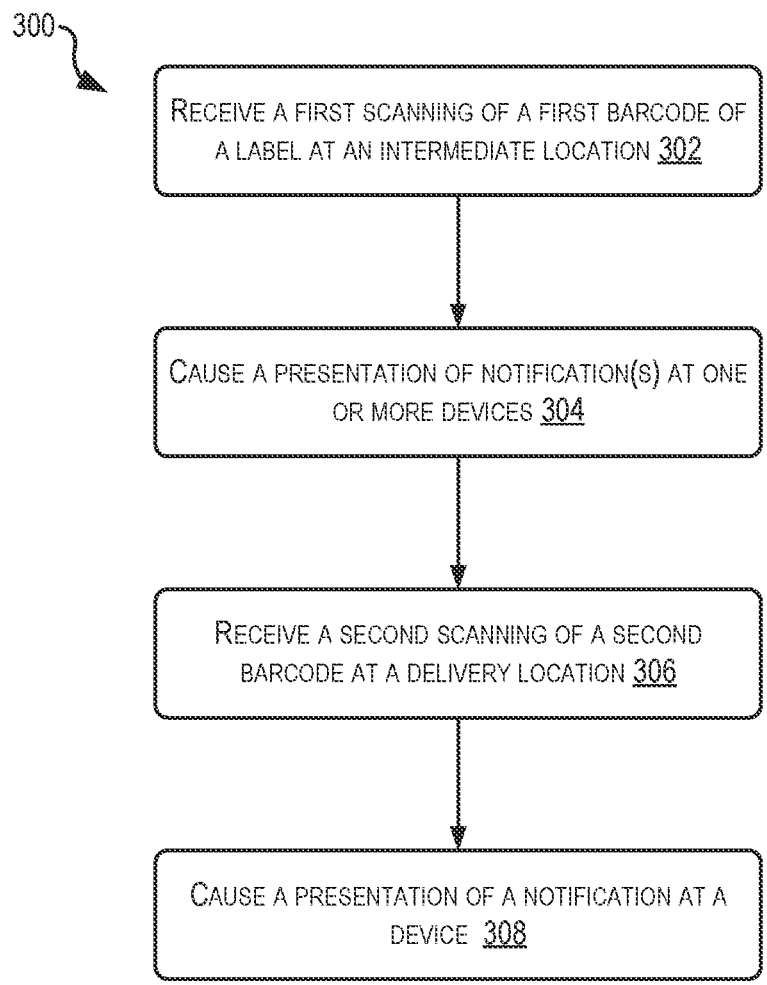
FIG. 3 illustrates an example flowchart showing a process of label management during a multi-location delivery, according to at least one example.

FIG. 3 illustrates an example flowchart showing a process 300 of label management for (e.g., label(s) 122 in FIG. 1) during a multi-location delivery, according to at least one example. The label management engine 1010 (FIG. 10) embodied in the computer system 1002 (FIG. 10) and/or within the user device 1004 (FIG. 10) may perform the process 300. Thus, while the description below is from the perspective of the computer system 1002, the user device 1004 may also perform the process 300 or portions of the process 300.

The process 300 may begin at block 302 by the computer system 1002 receiving a first scanning of a first barcode of a label (e.g., label(s) 122 in FIG. 1) at an intermediate location (e.g., intermediate location 116 in FIG. 1). The intermediate location is a location to which items are to be delivered and processed prior to being delivered to final delivery locations. The first barcode can be a barcode included on a label part associated with the intermediate location, which can be a label part that covers at least a final delivery location (e.g., delivery location 110 in FIG. 1) indicated on another label part of the label. The first barcode can be associated with first information about a delivery of an item to which the label is affixed. For example, the first barcode can be associated with tracking information of the item being transported from a fulfilment center to the intermediate location. So, upon a delivery agent reaching the intermediate location with the item, the delivery agent can use a device (e.g., scanning device, smart phone, etc.) to scan the first barcode. The computer system 1002 can receive the indication of the scanning, which can include an identifier of the item, a timestamp associated with the first scanning, an indication of the intermediate location, and any other suitable information (e.g., an expected time window of the item arriving at the delivery location).

The process 300 may continue at block 304 by the computer system 1002 causing a presentation of notification(s) at one or more devices. For instance, the computer system 1002 may cause a first notification to be presented at the device of the delivery agent that indicates the label part identifying the intermediate location is to be at least partially detached from the item. The first notification can include specific instructions for how to detach the label part based on an attachment mechanism used to affix the label part to the item. The computer system 1002 may additionally or alternatively case a second notification to be presented at a device of a user that requested the item be delivered to the delivery location. The second notification can include information about the first scanning. For instance, the second notification can indicate the time at which the item arrived at the intermediate location. In addition, the second notification may additionally indicate the expected time window of the item arriving at the delivery location.

The process 300 may continue at block 306 by the computer system 1002 receiving a second scanning of a second barcode at the delivery location. The second barcode can be a barcode included on a label part associated with the delivery location, which can be a label part that is revealed when the other label part is at least partially detached. The second barcode can be associated with second information about the delivery of the item. For example, the second barcode can be associated with tracking information of the item to the delivery location. In some instances, the second barcode may be the same as the first barcode. Upon a delivery agent reaching the delivery location with the item, the delivery agent can use a device (e.g., scanning device, smart phone, etc.) to scan the second barcode. The computer system 1002 can receive the indication of the scanning, which can include an identifier of the item, a timestamp associated with the second scanning, an indication of the delivery location, and any other suitable information (e.g., a description of a placement of the item at the delivery location, an image of the item at the delivery location, etc.).

The process 300 may continue at block 308 by the computer system 1002 causing a presentation of a notification at a device. For instance, the computer system 1002 may cause a notification to be presented at the device of the user that requested the item be delivered to the delivery location. The notification can include information about the second scanning. For instance, the notification can indicate the time at which the item arrived at the delivery location. In addition, the notification may additionally include the image of the item at the delivery location. The computer system 1002 may cause other notifications to be presented throughout the delivery process for the item. For instance, the first barcode, the second barcode, or another barcode of the label may be scanned at various locations during the delivery of the item to the delivery location, and each time a barcode of the item is scanned, the computer system 1002 can cause a notification to be presented at the device of the user indicating the location of the item.

Figure 4:
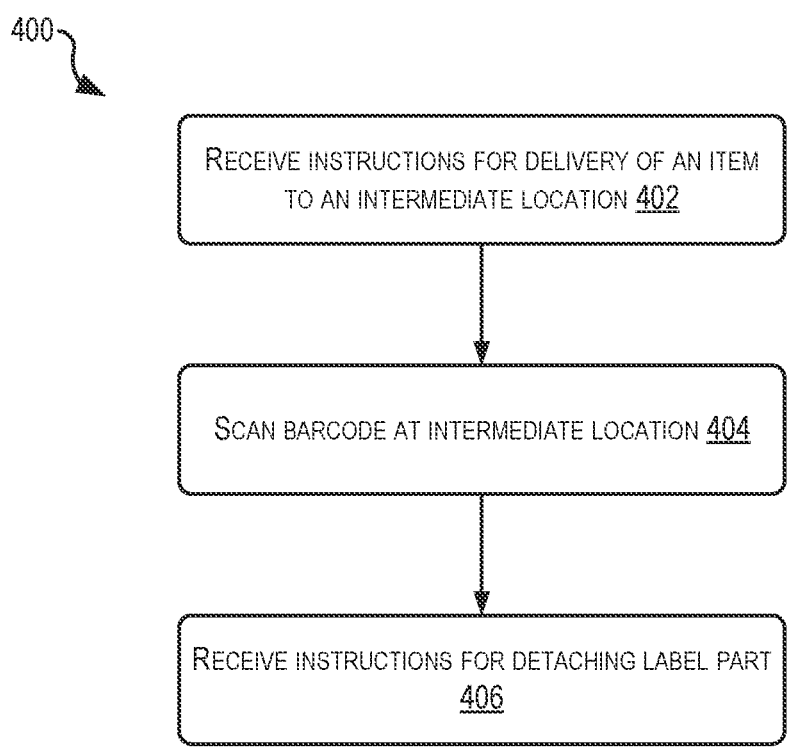
FIG. 4 illustrates an example flowchart showing a process of delivery-agent device processing during a multi-location delivery, according to at least one example.

FIG. 4 illustrates an example flowchart showing a process 400 of delivery-agent device processing during a multi-location delivery, according to at least one example. The label management engine 1010 (FIG. 10) embodied in the computer system 1002 (FIG. 10) and/or within the user device 1004 (FIG. 10) may perform the process 400. Thus, while the description below is from the perspective of the user device 1004, the computer system 1002 may also perform the process 400 or portions of the process 400.

The process 400 may begin at block 402 by the user device 1004 receiving instructions for delivery of an item (e.g., item 106 in FIG. 1) to an intermediate location (e.g., intermediate location 116 in FIG. 1). The instructions may include indications of multiple items being delivered to one or more locations. For instance, the instructions may instruct the delivery agent to deliver all of the items to the intermediate location, the instructions may instruct the delivery agent to deliver the item (and optionally additional items) to the intermediate and other items to other intermediate locations and/or delivery locations.

The process 400 may continue at block 404 by the user device 1004 scanning a barcode at the intermediate location. The barcode can be part of a label of the item that is at least associated with the intermediate location. For instance, the barcode may be part of a first label part of the label that identifies the intermediate location. The same barcode or a different barcode may also be associated with a second label part of the label that identifies a final delivery location (e.g., delivery location 110 in FIG. 1) for the item. Scanning the barcode can cause data associated with the delivery to the intermediate location to be sent to a computer system associated with the delivery. For example, the data can include an identifier of the intermediate location, a timestamp of the scanning, an identifier of the item, etc.

The process 400 may continue at block 406 by the user device 1004 receiving instructions for detaching a label part. For instance, the instructions may indicate that the first label part indicating the intermediate location is to be detached from the item. The instructions can identify an attachment mechanism (e.g., adhesive, hook-and-loop fastener, an edge, etc.) that couples the first label part to the item and that is to be removed to detach the first label part from the second label part. Further instructions about how to detach the first label part may additionally be provided, such as an indication of an area of the first label part that can be grabbed by the delivery agent to more easily remove the first label part. The user device 1004 may also display a visual aid (e.g., an image, a graphics interchange format (GIF) image, a video, etc.) illustrating how the first label part can be detached from the item.

Figure 5:
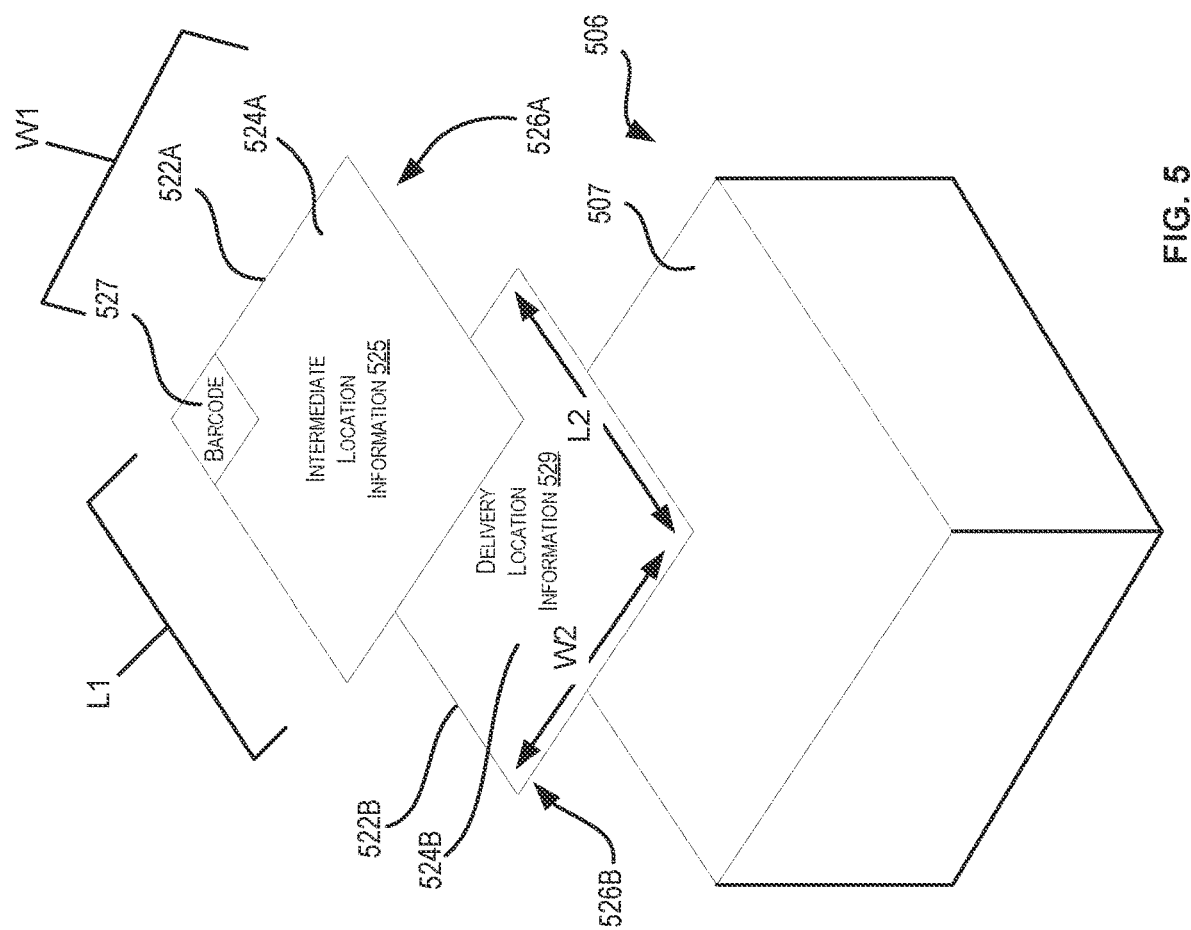
FIG. 5 illustrates an exploded view of an example label for a multi-location delivery, according to at least one example.

FIG. 5 illustrates an exploded view of an example label for a multi-location delivery, according to at least one example. The label includes label part 522A and label part 522B. The label is for an item 506 being delivered to a delivery location that is associated with an intermediate location. Label part 522B, which includes delivery location information 529 on a front surface 524B, which is attached to an exterior surface 507 of the item 506. The delivery location information 529 can include an indication of the delivery location for the item 506. For instance, the indication can be an address of the delivery location. The delivery location information 529 can also include an identifier of a user that requested the item 506 or that is receiving the item 506. A bottom surface 526B of the label part 522B can include an attachment mechanism, such as an adhesive, for coupling the label part 522B to the item 506.

Since the item 506 is to be delivered to the intermediate location before being delivered to the delivery location, the label part 522A can include intermediate location information 525 and can be positioned over at least the delivery location information 529 of the label part 522B. A front surface 524A of the label part 522A can include the intermediate location information 525 and a barcode 527. The intermediate location information 525 can include an indication of the intermediate location for the item 506. For instance, the indication can be an address of the intermediate location. The intermediate location information 525 can also include an identifier of an operator associated with the intermediate location and/or other information about the intermediate location. The barcode 527 can be used to track the item 506. A bottom surface 526A of the label part 522A can include an attachment mechanism, such as an adhesive, for coupling the label part 522A to the label part 522B and/or the item 506. The adhesive material of the bottom surface 526A may be less adhesive than the adhesive material of the bottom surface 526B so that the label part 522A can be detached from the label part 522B without the label part 522B becoming detached from the item 506.

Each of the label parts 522A-B are characterized by a length and a width. The length and width of label part 522A are designated by L1 and W1, respectively, and the length and width of label part 522B are designated by L2 and W2, respectively. As illustrated, the length of label part 522A can be equal to the length of label part 522B. Similarly, the width of label part 522A can be equal to the width of label part 522B. As such, the attachment mechanism on the bottom surface 526A can attach to the front surface 524B of the label part 522B. The attachment mechanism may cover an entirety of the bottom surface 526A, or only a portion of the bottom surface 526A (e.g., one or more edges). Alternatively, length of the label part 522A may be different from the length of the label part 522B and/or the width of the label part 522A may be different from the width of the label part 522B. For instance, the length and the width of the label part 522A may be less than the length and the width of the label part 522B. The length and width of the label part 522A may be specified so that the label part 522A covers only the delivery location information 529, and not an entirety of the label part 522B. In such cases, an amount of material used for the label part 522A can be reduced.

Figure 6:
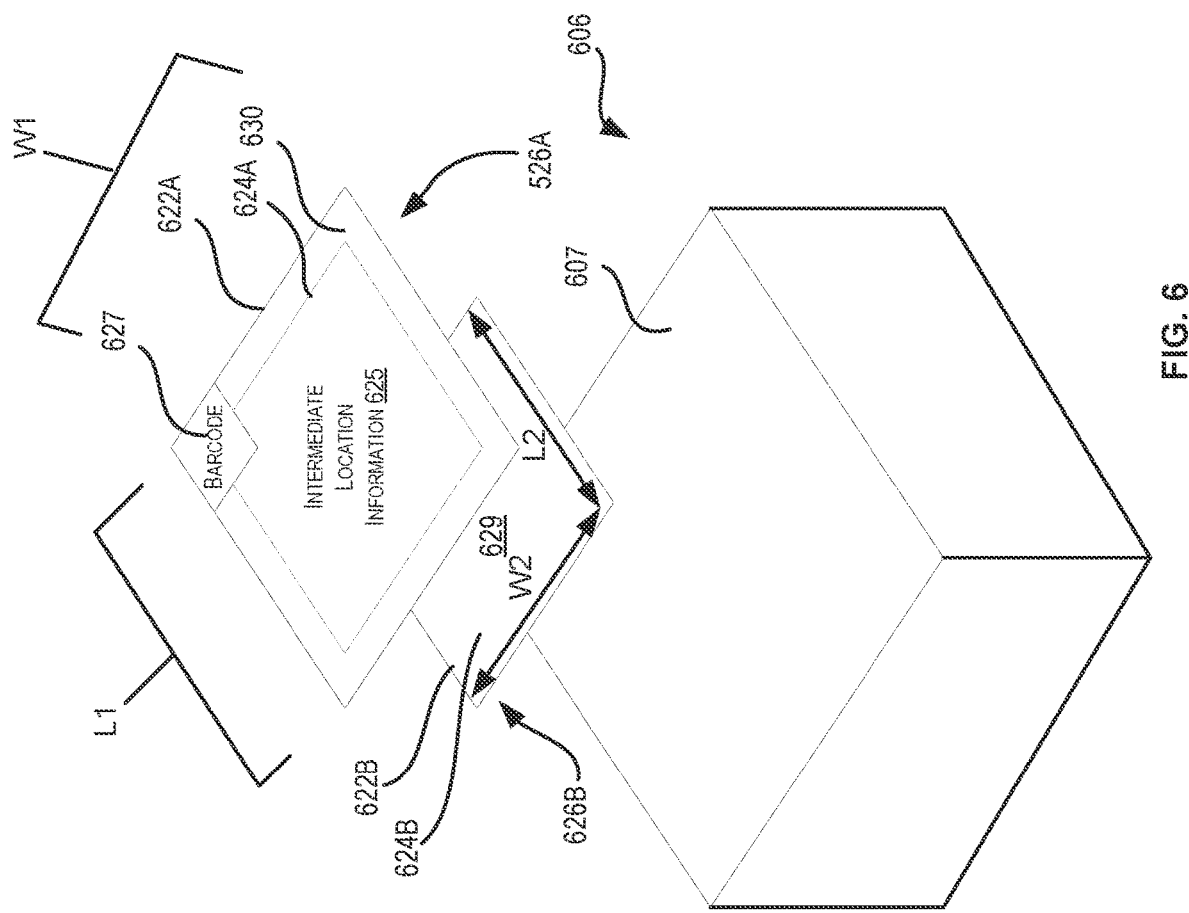
FIG. 6 illustrates another exploded view of an example label for a multi-location delivery, according to at least one example.

FIG. 6 illustrates another exploded view of an example label for a multi-location delivery, according to at least one example. The label includes label part 622A and label part 622B. The label is for an item 606 being delivered to a delivery location that is associated with an intermediate location. Label part 622B, which includes delivery location information 629 on a front surface 624B, which is attached to an exterior surface 607 of the item 606. The delivery location information 629 can include an indication of the delivery location for the item 606. For instance, the indication can be an address of the delivery location. The delivery location information 629 can also include an identifier of a user that requested the item 606 or that is receiving the item 606. A bottom surface 626B of the label part 622B can include an attachment mechanism, such as an adhesive, for coupling the label part 622B to the item 606.

Since the item 606 is to be delivered to the intermediate location before being delivered to the delivery location, the label part 622A can include intermediate location information 625 and can be positioned over at least the delivery location information 629 of the label part 622B. A front surface 624A of the label part 622A can include the intermediate location information 625 and a barcode 627. The intermediate location information 625 can include an indication of the intermediate location for the item 606. For instance, the indication can be an address of the intermediate location. The intermediate location information 625 can also include an identifier of an operator associated with the intermediate location and/or other information about the intermediate location. The barcode 627 can be used to track the item 606. A bottom surface 626A of the label part 622A can include an attachment mechanism 630, such as an adhesive or perforations, for coupling the label part 622A to the label part 622B and/or the item 606. If the attachment mechanism 630 is an adhesive, the adhesive of the bottom surface 626A may be less adhesive than the adhesive of the bottom surface 626B so that the label part 622A can be detached from the label part 622B without the label part 622B becoming detached from the item 606. If the attachment mechanism 630 is perforations, the perforations may be ripped to reveal the delivery location information 629 once the item 606 reaches the intermediate location.

Each of the label parts 622A-B are characterized by a length and a width. The length and width of label part 622A are designated by L1 and W1, respectively, and the length and width of label part 622B are designated by L2 and W2, respectively. As illustrated, the length of label part 622A is greater than the length of label part 622B. Similarly, the width of label part 622A can be greater than the width of label part 622B. The attachment mechanism 630 for the bottom surface 626A may only be in a perimeter area (designated by the dotted line) that extends from L2 and W2 to edges of the label part 622A, such that an area of the bottom surface 626A that contacts the front surface 624B of the label part 622B does not include the attachment mechanism 630. As such, the attachment mechanism 630 on the bottom surface 626A can attach to the exterior surface 607 of the item 606. Alternatively, length of the label part 622A may be equal to or smaller than the length of the label part 622B and/or the width of the label part 622A may be equal to or smaller than the width of the label part 522B. For instance, the length and the width of the label part 622A may be less than the length and the width of the label part 622B. The length and width of the label part 622A may be specified so that the label part 622A covers only the delivery location information 629, and not an entirety of the label part 622B. In such cases, an amount of material used for the label part 622A can be reduced.

In an example, the attachment mechanism 630 may be hook-and-loop fastener. The exterior surface 607 can include a first hook-and-loop fastener piece that faces towards the bottom surface 626A, and the perimeter area of the bottom surface 626A can include a second hook-and-loop fastener piece for coupling to the first hook-and-loop fastener piece and attaching the label part 622A to the item 606.

Figure 7:
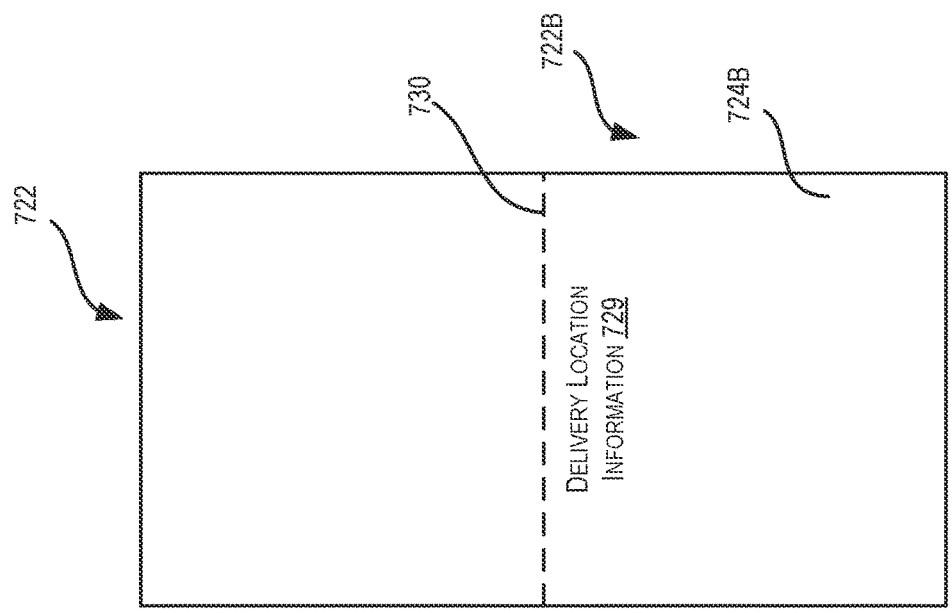
FIG. 7 illustrates views of an example label for a multi-location delivery, according to at least one example.
Figure 7:
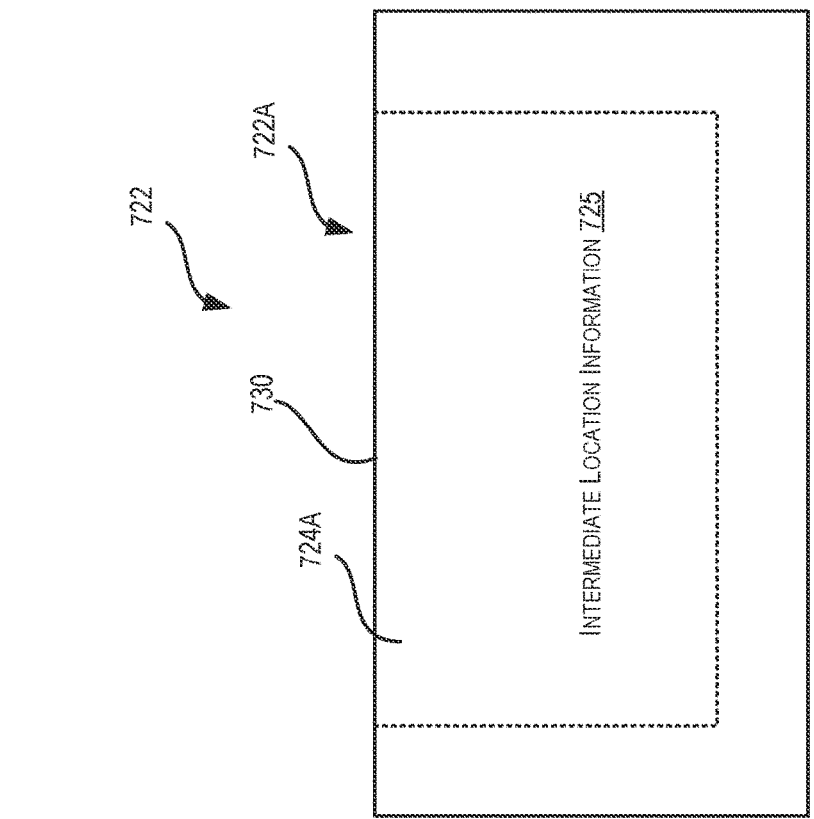

FIG. 7 illustrates views of an example label 722 for a multi-location delivery, according to at least one example. The label 722 includes label part 722A and label part 722B. The label 722 is for an item (e.g., item 106 in FIG. 1) being delivered to a delivery location that is associated with an intermediate location. Since the item is to be delivered to the intermediate location before being delivered to the delivery location, the label part 722A can include intermediate location information 725 and can be positioned over at least delivery location information 729 of the label part 722B. A front surface 724A of the label part 722A can include the intermediate location information 725 and, optionally, a barcode. The intermediate location information 725 can include an indication of the intermediate location for the item. For instance, the indication can be an address of the intermediate location. The intermediate location information 725 can also include an identifier of an operator associated with the intermediate location and/or other information about the intermediate location. The label part 722A can include an attachment mechanism 730, such as shared edge between the label part 722A and the label part 722B. Other edges may include perforations (indicated by the dotted line) that can be removed to reveal the label part 722B.

After the perforations are removed, the label 722 can be unfolded along the attachment mechanism 730 to reveal delivery location information 729 indicated on a front surface 724B of the label part 722B. The delivery location information 729 can include an indication of the delivery location for the item. For instance, the indication can be an address of the delivery location. The delivery location information 729 can also include an identifier of a user that requested the item or that is receiving the item. A bottom surface (not shown) of the label part 722B can include an attachment mechanism, such as an adhesive, for coupling the label part 722B to the item.

While the perforations in FIG. 7 are illustrated as being in a "U" shape, other examples may include other shapes of perforations. For example, perforations may extend from a top to a bottom on one or more sides of the label 722. In addition, the perforations may extend from a left edge to a right edge of the label 722. Other shapes of perforations are also possible.

Figure 8:
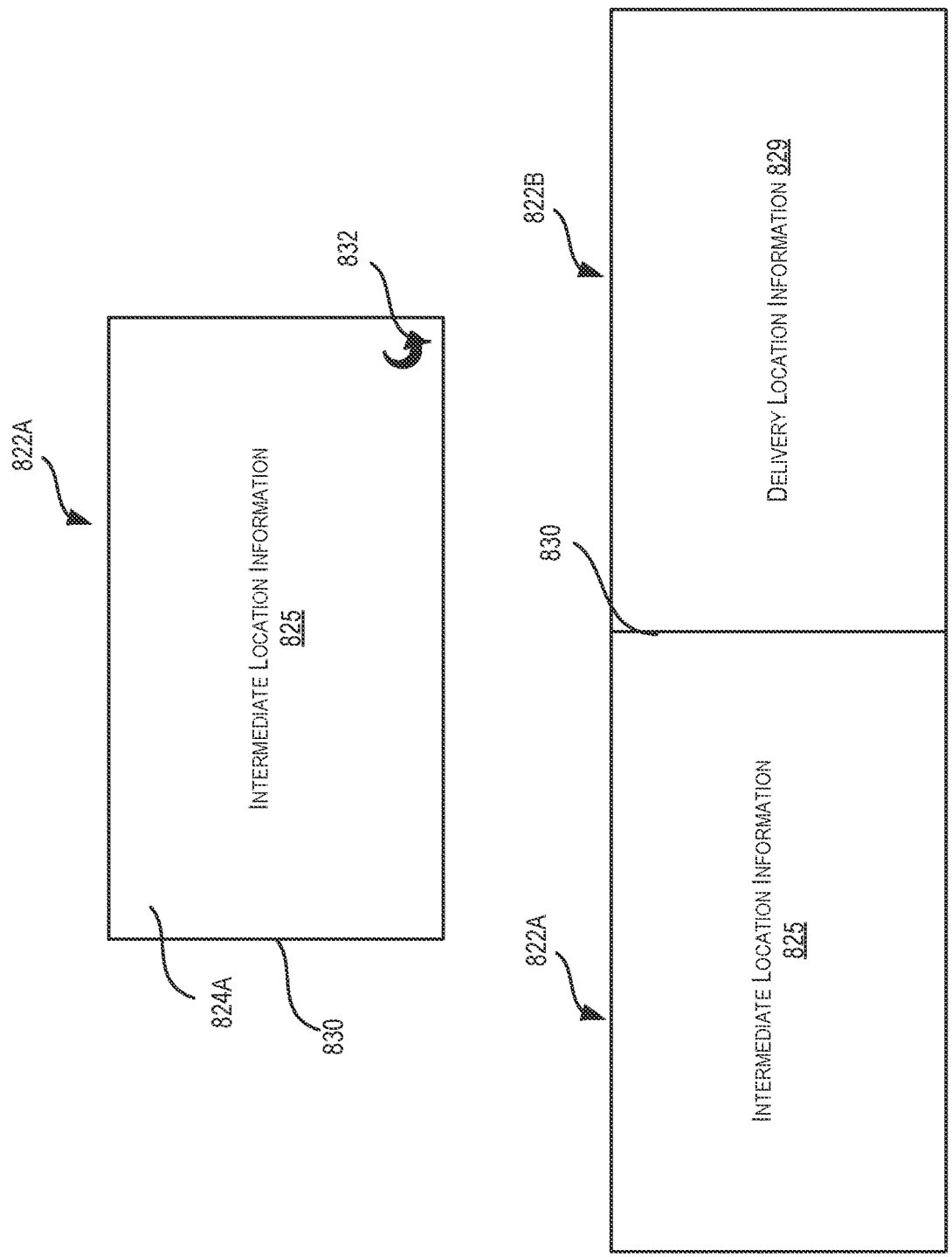
FIG. 8 illustrates views of another example label for a multi-location delivery, according to at least one example.

FIG. 8 illustrates views of another example label for a multi-location delivery, according to at least one example. The label includes label part 822A and label part 822B. The label is for an item (e.g., item 106 in FIG. 1) being delivered to a delivery location that is associated with an intermediate location. Since the item is to be delivered to the intermediate location before being delivered to the delivery location, the label part 822A can include intermediate location information 825 and can be positioned over at least delivery location information 829 of the label part 822B. A front surface 824A of the label part 822A can include the intermediate location information 825 and, optionally, a barcode. The intermediate location information 825 can include an indication of the intermediate location for the item. For instance, the indication can be an address of the intermediate location. The intermediate location information 825 can also include an identifier of an operator associated with the intermediate location and/or other information about the intermediate location. The label part 822A can include an attachment mechanism 830, such as shared edge between the label part 822A and the label part 822B. Other edges may be uncoupled from the label part 822B.

The label part 822A can also include a visual indicator 832 for indicating that the label includes another portion with additional information about the delivery. For instance, the visual indicator 832 is illustrated as an arrow in FIG. 8, indicating that the label part 822A can be unpeeled from the bottom-right corner to reveal the label part 822B. Other visual indicators may include a color of the label part 822A, a textual identifier of another label part, or any other suitable visual indicator.

The label can be unfolded along the attachment mechanism 830 to reveal the delivery location information 829 indicated on a front surface 824B of the label part 822B. The delivery location information 829 can include an indication of the delivery location for the item. For instance, the indication can be an address of the delivery location. The delivery location information 829 can also include an identifier of a user that requested the item or that is receiving the item. A bottom surface (not shown) of the label part 822B can include an attachment mechanism, such as an adhesive, for coupling the label part 822B to the item.

Figure 9:
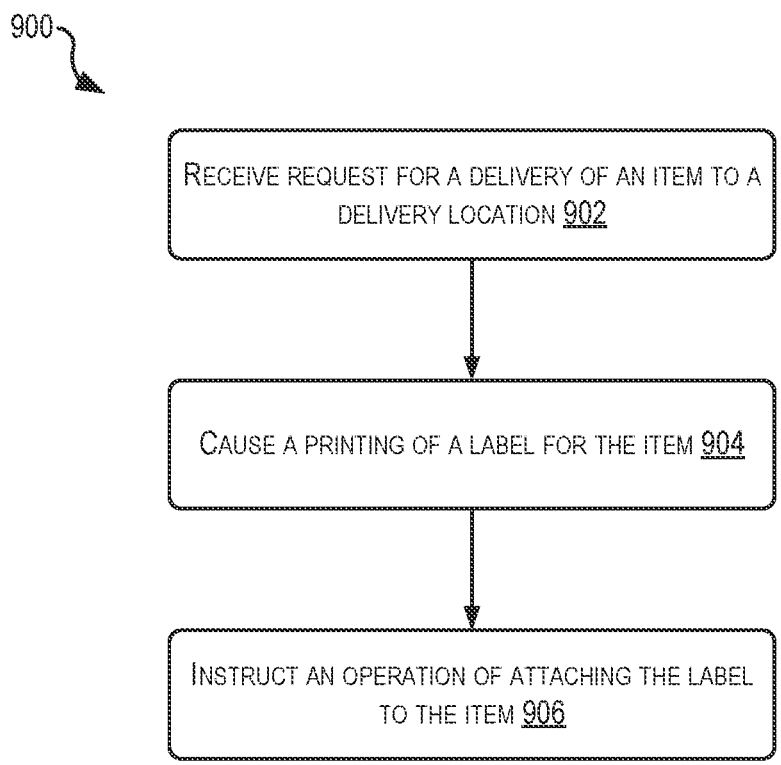
FIG. 9 illustrates an example flowchart showing a process for implementing techniques relating to relating to composite shipping labels for multi-location deliveries, according to at least one example.

FIG. 9 illustrates an example flowchart showing a process 900 for implementing techniques relating to relating to composite shipping labels for multi-location deliveries, according to at least one example. The label management engine 1010 (FIG. 10) embodied in the computer system 1002 (FIG. 10) and/or within the user device 1004 (FIG. 10) may perform the process 900. Thus, while the description below is from the perspective of the computer system 1002, the user device 1004 may also perform the process 900 or portions of the process 900.

The process 900 may begin at block 902 by the computer system 1002 receiving a request 108 (FIG. 1) for a delivery of an item 106 (FIG. 1) to a delivery location 110 (FIG. 1). The delivery location 110 may be referred to as a final delivery location 110. The delivery location 110 is associated with an intermediate location 116 (FIG. 1), which may also be referred to as an intermediate delivery location 116. The item 106 is to be delivered to the intermediate location 116 prior to delivery to the delivery location 110. The intermediate delivery location 116 is associated with a plurality of final delivery locations including the final delivery location 110. The computer system 1002 access a database storing associations between a plurality of delivery locations and a plurality of intermediate locations in response to receiving the request 108. The database includes an association between the delivery location 110 and the intermediate location 116. The computer system 1002 determines that the delivery location 110 is associated with the intermediate location 116 based on the association.

The process 900 may continue at block 904 by the computer system 1002 causing a printing of a label 122 (FIG. 1) for the item 106. The label 122 is a composite delivery label for the item 106. The label 122 includes a first label part, which may be a first label, configured to couple with an exterior surface of the item 106. The computer system 1002 can cause a first printing of the first label for the item 106. A first front surface of the first label part identifies the final delivery location 110 for the item 106 and an identifier of a user associated with the final delivery location 110. The first label includes a first address of the delivery location 110 indicated on the first front surface and a first attachment mechanism on a first bottom surface of the first label. The first label can further include a first barcode associated with first information about the delivery to the delivery location 110.

The label 122 also includes a second label part, which may be a second label, positioned to cover at least a portion of the final delivery location 110 on the first front surface and at least partially detachable from the first label part. The computer system 1002 can cause a second printing of the second label for the item 106. The second label part may be configured to be positioned at least partially covering the first label part. A second front surface of the second label part identifies the intermediate delivery location 116. The second label part is configured to be at least partially detached from the first label part to reveal the final delivery location 110 for the item 106. The second label includes a second address of the intermediate location 116 indicated on a second front surface of the second label and a second attachment mechanism on a second bottom surface of the second label. The second label part can also include a second barcode associated with second information about the delivery to the intermediate location 116. The second label part can include a barcode associated with information about the delivery to the intermediate delivery location 116. The second label part can include a visual indicator that the label 122 includes the first label part.

The first label part can be a separate label from the second label part. Or, the second label part may be coupled to the first label part along at least one edge of the second label part and may be detachable from the first label part along at least one additional edge. The second label part can be coupled to the first label part along at least one edge of the second label part by perforations that are configured to be removed to reveal the first label part.

The first attachment mechanism can be a first adhesive material and the second attachment mechanism can be a second adhesive material that is less adhesive than the first adhesive material. Alternatively, the first bottom surface of the first label part can include an adhesive for coupling the first label part to the exterior surface of the item and the exterior surface of the item can include a first hook-and-loop fastener piece facing towards a second bottom surface of the second label part that includes a second hook-and-loop fastener piece for coupling to the first hook-and-loop fastener piece.

The first label part can include a first length and a first width and the second label part can include a second length and a second width. The first length can be equal to the second length and the first width can be equal to the second width. The bottom surface of the second label part can include an adhesive for attaching the second label part to the first label part. In another example, the first length can be greater than the second length and the first width can be greater than the second width. The process 900 may continue at block 906 by the computer system 1002 instructing an operation of attaching the label 122 to the item 106. The operation can include a first operation and a second operation. The computer system 1002 can instruct the first operation of adhering, by the first attachment mechanism, the first label part to the exterior surface of the item 106. The computer system 1002 can instruct the second operation of adhering, by the second attachment mechanism, the second label part at least partially over the first label part. The second operation can involve adhering the second label on top of the first label such that the second label covers at least the first address of the deliver location printed on the first label.

The computer system 1002 can receive a scanning of the second barcode at the intermediate location 116 by a user device and cause a presentation of a notification at the user device. The notification can indicate that the second label part is to be at least partially detached from the first label part prior to delivery to the delivery location 110. The computer system 1002 may additionally or alternatively cause a presentation of a notification at a user device of a user associated with the delivery location 110 that indicates the delivery of the item 106 to the intermediate location 116. The computer system 1002 can receive a scanning of the first barcode at the delivery location 110 and cause a presentation of a notification at the user device of the user associated with the delivery location 110. The notification can indicate the delivery of the item 106 to the delivery location 110.

Figure 10:
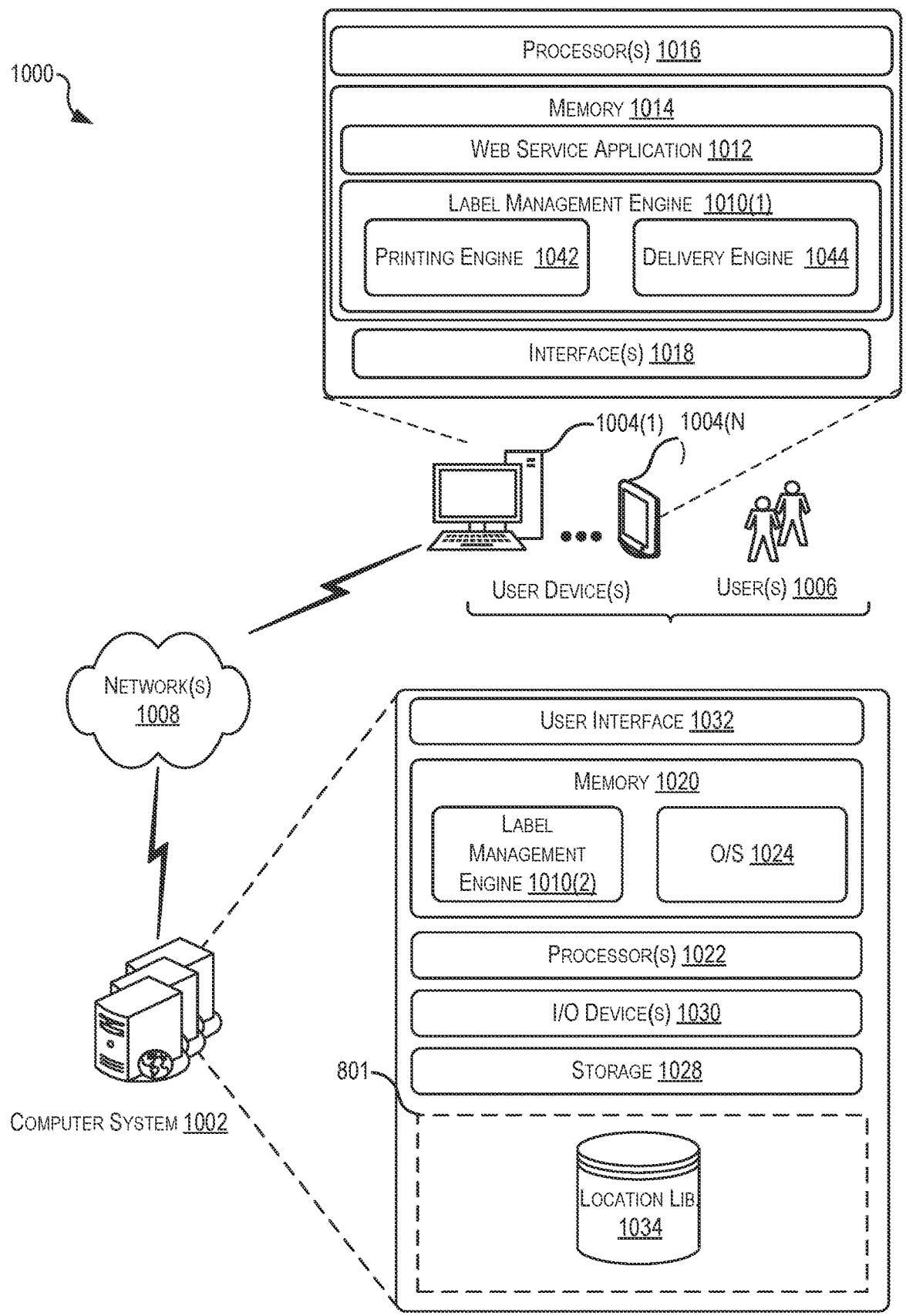
FIG. 10 illustrates an example schematic architecture for implementing techniques relating to composite labels for multi-location deliveries, according to at least one example.

FIG. 10 illustrates an example schematic architecture 1000 for implementing techniques relating to composite shipping labels for multi-location deliveries, according to at least one example. The architecture 1000 may include a computer system 1002 (e.g., the computer system described herein) in communication with one or more user devices 1004(1)-1004(N) via one or more networks 1008 (hereinafter, "the network 1008").

The user device 1004 may be operable by one or more users 1006 to interact with the computer system 1002. The users 1006 may be administrators, developers, or others that desire to test or utilize operations of the techniques described herein. The user device 1004 may be any suitable type of computing device such as, but not limited to, a tablet, a mobile phone, a smart phone, a network-enabled streaming device (a high-definition multimedia interface ("HDMI") micro-console pluggable device), a personal digital assistant ("PDA"), a laptop computer, a desktop computer, a thin-client device, a tablet computer, etc. For example, the user device 1004(1) is illustrated as a desktop computer, while the user device 1004(N) is illustrated as an example of a handheld mobile device.

The user device 1004 may include a memory 1014 and processor(s) 1016. In the memory 1014 may be stored program instructions that are loadable and executable on the processor(s) 1016, as well as data generated during the execution of these programs. Depending on the configuration and type of user device 1004, the memory 1014 may be volatile (such as random access memory ("RAM")) and/or non-volatile (such as read-only memory (ROM), flash memory, etc.).

In some examples, the memory 1014 may include a web service application 1012 and a version of a label management engine 1010 (e.g., 1010(1)). The web service application 1012 and/or the label management engine 1010(1) may allow the user 1006 to interact with the computer system 1002 via the network 1008. The user device 1004 may also include one or more interfaces 1018 to enable communication with other devices, systems, and the like. The label management engine 1010, whether embodied in the user device 1004 or the computer system 1002, may be configured to perform the techniques described herein.

The label management engine 1010 includes a printing engine 1042 and a delivery engine 1044. In an example, the label management engine 1010 can include any other suitable engines, modules, models, and the like.

The printing engine 1042 can manage various tasks related to the generation and of label parts for a label. In an example, the printing engine 1042 may ingest data of delivery requests, may determine associations between final delivery locations and intermediate delivery locations, instruct printing of label parts for intermediate delivery locations and final delivery locations, and any other suitable tasks. The printing engine 1042 may be configured to communicate with multiple printers based on delivery locations being associated with intermediate locations, and/or perform other suitable tasks with respect to generating the labels described herein.

The delivery engine 1044 can include one or more computer services for receiving barcode scannings and generating notifications. In an example, the delivery engine 1044 may be configured to detect a barcode scanning and trigger a notification to a device of a delivery agent that performed the scanning or a device associated with a user requesting the item. Upon determining the scanning is for an item delivery at an intermediate location, the delivery engine 1044 may generate the notification indicating a first label part of the label is to be at least partially detached from the item to reveal a second label part indicating the final delivery location so that the remainder of the delivery to the delivery location can be completed.

Turning now to the details of the computer system 1002, the computer system 1002 may include one or more computer system computers, perhaps arranged in a cluster of servers or as a server farm, and may host web service applications. The function of the computer system 1002 may be implemented a cloud-based environment such that individual components of the computer system 1002 are virtual resources in a distributed environment.

The computer system 1002 may include at least one memory 1020 and one or more processing units (or processor(s)) 1022. The processor 1022 may be implemented as appropriate in hardware, computer-executable instructions, software, firmware, or combinations thereof. Computer-executable instruction, software, or firmware implementations of the processor 1022 may include computer-executable or machine-executable instructions written in any suitable programming language to perform the various functions described. The memory 1020 may include more than one memory and may be distributed throughout the computer system 1002. The memory 1020 may store program instructions that are loadable and executable on the processor(s) 1022, as well as data generated during the execution of these programs. Depending on the configuration and type of memory including the computer system 1002, the memory 1020 may be volatile (such as RAM and/or non-volatile (such as read-only memory ("ROM"), flash memory, or other memory)). The memory 1020 may include an operating system 1024 and one or more application programs, modules, or services for implementing the features disclosed herein including at least a version of the label management engine 1010 (e.g., 1010(2)). For example, the label management engine 1010(2) may perform the functionality described herein.

The computer system 1002 may also include additional storage 1028, which may be removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. The additional storage 1028, both removable and non-removable, is an example of computer-readable storage media. For example, computer-readable storage media may include volatile or non-volatile, removable, or non-removable media implemented in any suitable method or technology for storage of information such as computer-readable instructions, data structures, program modules, or other data. As used herein, modules, engines, applications, and components may refer to programming modules executed by computing systems (e.g., processors) that are part of the computer system 1002 and/or part of the user device 1004.

The computer system 1002 may also include input/output (I/O) device(s) and/or ports 1030, such as for enabling connection with a keyboard, a mouse, a pen, a voice input device, a touch input device, a display, speakers, a printer, or other I/O device.

In some examples, the computer system 1002 may also include one or more user interface(s) 1032. The user interface 1032 may be utilized by an operator, curator, or other authorized user to access portions of the computer system 1002. In some examples, the user interface 1032 may include a graphical user interface, voice interfaces, web-based applications, programmatic interfaces such as APIs, or other user interface configurations.

The computer system 1002 may also include a data store 1001. In some examples, the data store 1001 may include one or more databases, data structures, or the like for storing and/or retaining information associated with the computer system 1002 and which, in some examples, may be accessible by the user devices 1004. The label management engine 1010 is communicatively coupled (e.g., via a wired connection or a wireless connection) to the data store 1001. The data store 1001 includes a location library 1034 storing associations between delivery locations and intermediate locations. In an example, the data store 1001 can include any other suitable data, databases, libraries, and the like.

Figure 11:
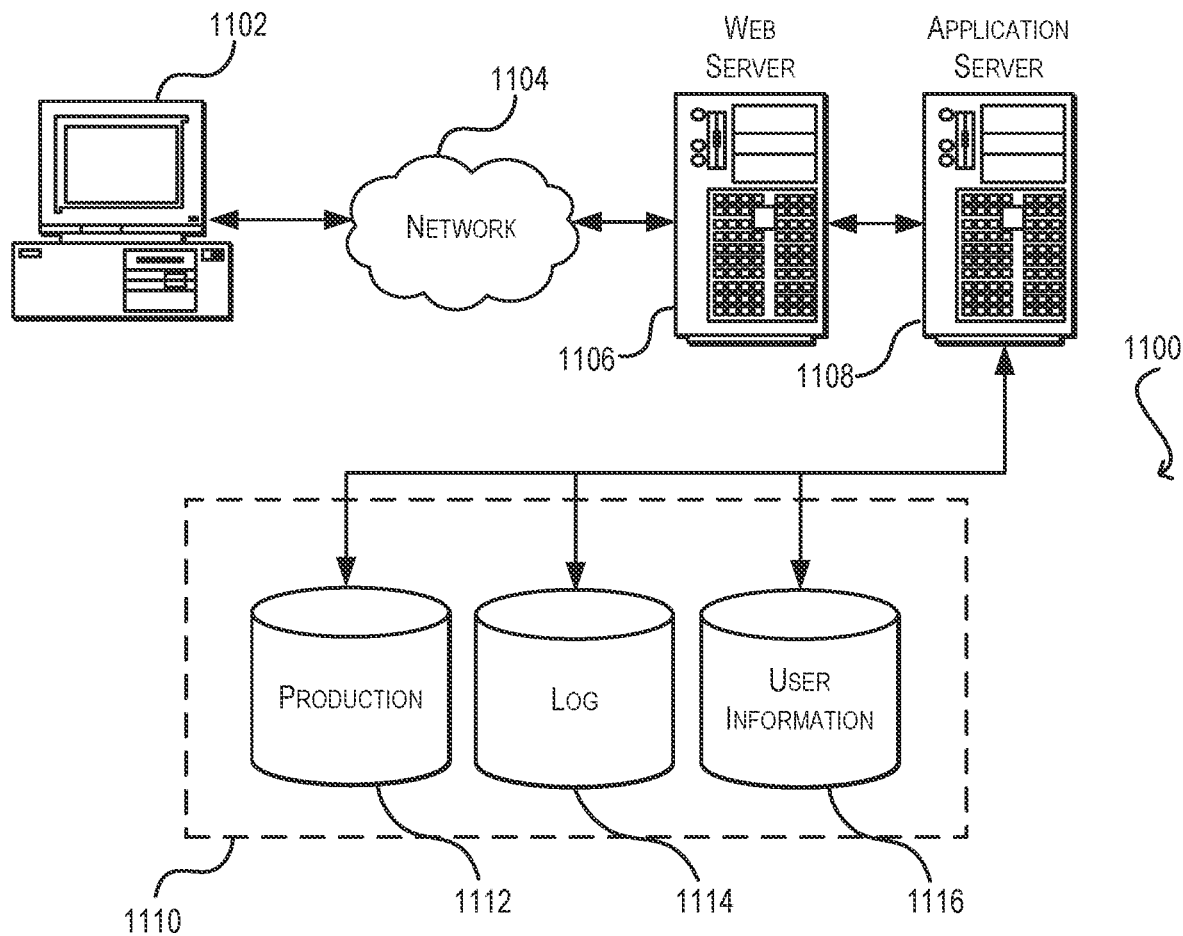
FIG. 11 illustrates an environment in which various embodiments can be implemented.

FIG. 11 illustrates aspects of an example environment 1100 for implementing aspects in accordance with various embodiments. As will be appreciated, although a Web-based environment is used for purposes of explanation, different environments may be used, as appropriate, to implement various embodiments. The environment includes an electronic client device 1102, which can include any appropriate device operable to send and receive requests, messages, or information over an appropriate network 1104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1102 and the application server 1108, can be handled by the Web server. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing production data 1112 and user information 1116, which can be used to serve content for the production side. The data store also is shown to include a mechanism for storing log data 1114, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1102. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system comprising:
one or more processors; and
one or more memories storing instructions that, upon execution by the one or more processors, configure the one or more processors to:
receive a request for a delivery of an item to a delivery location associated with an intermediate location, wherein the item is to be delivered to the intermediate location prior to being delivered to the delivery location;
cause a printing of a label for the item, wherein the label comprises:
a first label part indicating the delivery location, the first label part configured to be coupled to the item; and
a second label part indicating the intermediate location, wherein the second label part is configured to be positioned at least partially covering the first label part and at least partially detachable from the first label part; and
instruct an operation of attaching the label to the item.

2. The system of claim 1, wherein the first label part comprises a first address of the delivery location indicated on a first front surface of the first label part and a first attachment mechanism on a first bottom surface of the first label part, and wherein the second label part comprises a second address of the intermediate location and a barcode associated with information about the delivery indicated on a second front surface of the second label part and a second attachment mechanism on a second bottom surface of the second label part.

3. The system of claim 2, wherein the operation comprises a first operation and a second operation, and wherein the one or more memories further store instructions that, upon execution by the one or more processors, configure the one or more processors to instruct the operation by:
instructing the first operation of adhering, by the first attachment mechanism, the first label part to an exterior surface of the item; and
instructing the second operation of adhering, by the second attachment mechanism, the second label part at least partially over the first label part.

4. The system of claim 1, wherein the second label part comprises a barcode associated with information about the delivery to the intermediate location, and wherein the one or more memories further store instructions that, upon execution by the one or more processors, configure the one or more processors to:
receive a scanning of the barcode at the intermediate location; and
causing a presentation of a notification at a user device of a user associated with the delivery location, the notification indicating the delivery of the item to the intermediate location.

5. The system of claim 1, wherein the first label part comprises a barcode associated with information about the delivery to the delivery location, and wherein the one or more memories further store instructions that, upon execution by the one or more processors, configure the one or more processors to:
receive a scanning of the barcode at the delivery location; and
causing a presentation of a notification at a user device of a user associated with the delivery location, the notification indicating the delivery of the item to the delivery location.

6. The system of claim 1, wherein the one or more memories further store instructions that, upon execution by the one or more processors, configure the one or more processors to:
access a database storing associations between a plurality of delivery locations and a plurality of intermediate locations in response to receiving the request, wherein the database includes an association between the delivery location and the intermediate location; and
determine that the delivery location is associated with the intermediate location based on the association.

7. The system of claim 1, wherein the second label part includes a visual indicator that the label includes the first label part.

8. The system of claim 1, wherein the second label part comprises a barcode associated with information about the delivery to the intermediate location, and wherein the one or more memories further store instructions that, upon execution by the one or more processors, configure the one or more processors to:
receive a scanning of the barcode at the intermediate location by a user device; and
cause a presentation of a notification at the user device, the notification indicating that the second label part is to be at least partially detached from the first label part prior to delivery to the delivery location.

* * * * *